United States Patent
Ford et al.

(10) Patent No.: US 7,689,202 B2
(45) Date of Patent: Mar. 30, 2010

(54) SYSTEM AND METHOD FOR PROVIDING PERSONAL AND EMERGENCY SERVICE HAILING IN WIRELESS NETWORK

(75) Inventors: Daniel A. Ford, Los Gatos, CA (US); Reiner Kraft, Gilroy, CA (US); Jussi P. Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/416,560

(22) Filed: Apr. 1, 2009

(65) Prior Publication Data

US 2009/0209228 A1  Aug. 20, 2009

(51) Int. Cl.
*H04M 11/04* (2006.01)
(52) U.S. Cl. .................. 455/404.1; 455/456.1
(58) Field of Classification Search ............. 455/404.1, 455/404.2, 456.1, 456.6, 518, 519, 521; 340/539.1, 340/539.12, 539.23
See application file for complete search history.

(56) References Cited

U.S. PATENT DOCUMENTS

| | | | |
|---|---|---|---|
| 5,175,758 A | | 12/1992 | Levanto et al. |
| 5,343,206 A * | | 8/1994 | Ansaldi et al. ............... 342/70 |
| 5,539,395 A * | | 7/1996 | Buss et al. ................. 340/7.43 |
| 5,705,980 A * | | 1/1998 | Shapiro ................. 340/539.11 |
| 5,797,093 A | | 8/1998 | Houde |
| 5,802,470 A | | 9/1998 | Gaulke et al. |
| 5,838,237 A | | 11/1998 | Revell et al. |
| 5,918,159 A * | | 6/1999 | Fomukong et al. .......... 340/7.21 |
| 5,929,771 A | | 7/1999 | Gaskill |
| 6,028,514 A * | | 2/2000 | Lemelson et al. ...... 340/539.13 |
| 6,044,257 A | | 3/2000 | Boling et al. |
| 6,064,722 A | | 5/2000 | Clise et al. |
| 6,083,248 A | | 7/2000 | Thompson |
| 6,101,391 A * | | 8/2000 | Ishizuka et al. ............. 455/457 |
| 6,369,756 B1 * | | 4/2002 | Wang et al. .................. 342/367 |
| 6,441,752 B1 * | | 8/2002 | Fomukong ................... 340/988 |
| 6,529,136 B2 * | | 3/2003 | Cao et al. ................. 340/686.1 |
| 6,587,782 B1 * | | 7/2003 | Nocek et al. ................. 701/200 |
| 6,650,894 B1 * | | 11/2003 | Berstis et al. ................ 455/420 |
| 7,027,801 B1 * | | 4/2006 | Hall et al. ................. 455/412.1 |
| 2002/0183077 A1 * | | 12/2002 | Fomukong ................... 455/456 |
| 2003/0182052 A1 * | | 9/2003 | DeLorme et al. ............ 701/201 |

FOREIGN PATENT DOCUMENTS

JP    2001339536 A  *  12/2001

* cited by examiner

*Primary Examiner*—Sam Bhattacharya
(74) *Attorney, Agent, or Firm*—Jeffrey N. Giunta; Fleit, Gibbons, Gutman, Bongini & Bianco P.L.

(57) ABSTRACT

A method and system for providing personal and emergency service hailing. A profile database stores profiles with individualized distance thresholds for each of a number of wireless devices. A wireless message proximity request is received from a requesting wireless device. Distances between a location of the requesting wireless device and locations of each of other wireless communications devices is computed and compared to individualized distance thresholds stored for the requesting wireless communications device. A set of wireless devices consisting of wireless devices that satisfy the individualized distance thresholds for the requesting wireless communications device is identified and a wireless message proximity response is sent to the requesting wireless communications device. The wireless message proximity response identifies the set of wireless communications devices that satisfy the at least one individualized distance threshold.

20 Claims, 7 Drawing Sheets

*WCD MEANS "WIRELESS COMMUNICATION DEVICE"

FIG. 7

SYSTEM AND METHOD FOR PROVIDING PERSONAL AND EMERGENCY SERVICE HAILING IN WIRELESS NETWORK

CROSS-REFERENCE TO RELATED APPLICATIONS

This application is based upon and claims priority from prior U.S. application Ser. No. 09/855,096, filed on May 14, 2001, now U.S. Pat. No. 7,529,537, the entire disclosure of which is incorporated by reference in its entirety.

BACKGROUND OF THE INVENTION

1. Field of the Invention

This invention generally relates to a system and method for locating and contacting persons and facilities in a wireless network and specifically relates to identifying and contacting persons and facilities nearest to a requestor's location by use of a central location-tracking database.

2. Description of Related Art

Rapid advances are being made in the area of wireless communications. An increasing number of applications are being developed for wireless communications device platforms, ranging from smart cellular phones and wireless communicators, to two-way text pagers. Many of these products interface with location-tracking devices, such as Global Positioning System ("GPS") receivers, that deliver real-time location based information and services to users of wireless communications devices ("WCDs"). The location-tracking capabilities of these devices give rise to the opportunity to solve two problems inherent in today's WCDs.

First, the current state of the art requires that WCDs be contacted using a unique identifier or number. If, for instance, two adjacent users of WCDs wish to contact each other, one user must know the unique identifier or number of the other user, or vice versa. Without the unique wireless communications device ("WCD") identifier or number, a voice or data communication cannot be initiated although the two users can identify each other's position relative to their own positions. For example, if two cellular phone users separated by a distance of 50 meters wished to initiate communication via their cellular phones, but neither knew the other's unique identifier or number, one would have to shout or otherwise indicate their unique identifier to the other.

Similarly, two adjacent WCD users may not have compatible WCDs, so a direct link cannot be established. For instance, a cellular phone user currently may not be able to directly contact a user of a unidirectional or bidirectional pager ("pager") or personal digital assistant ("PDA") with a wireless area network interface.

Secondly, a key feature of today's WCDs is the safety they provide by enabling the user of such a device to contact emergency services when required. The current technology only has the capability to identify emergency services and facilities that are located within a fairly large area. Currently, cellular phone networks achieve the routing of emergency calls by identifying the particular mobile switching center immediately available to the cellular user. Thus, each mobile switching center is identified with a corresponding emergency facility.

The inherent disadvantage to this system is that the area covered by a particular mobile switching center can be quite large, encompassing tens of miles of roadway. While the current technology would enable a WCD user to contact an emergency facility located within that mobile switching center coverage area, it would necessarily ignore an ambulance or police cruiser sitting 50 meters adjacent to the WCD user. Furthermore, the current technology will only provide access to the particular emergency facility dedicated to a particular mobile switching center while there may be another appropriate emergency facility within a short distance of the WCD user.

Therefore a need exists to overcome the problems with the prior art as discussed above, and particularly for a system and method for personal and emergency service hailing in a wireless network.

SUMMARY OF THE INVENTION

The present invention, according to a preferred embodiment, overcomes problems with the prior art by providing a central location tracking system for wireless communications device ("WCD") users. A WCD user will be able to identify other WCD users in their area and initiate communication with another user by identifying the approximate position of the other WCD user relative to their current position. For example, a WCD user, using the present invention, will be able to identify those users around him and, for example, contact the WCD user who is 30 meters to the north or the WCD user 30 meters to the southwest. Therefore, WCD users can initiate communication with one another without knowing the unique identifier or number of the other WCD.

Similarly, according to a preferred embodiment of the present invention, a communication system provides WCD users with the flexibility to initiate communications with devices that may be normally incompatible with one another. A communication system, according to the present invention, identifies a preferred device of users in proximity to a user initiating a communication request. The device type or types may be presented to the user initiating the communication request. Should the user initiating the communication request desire to communicate with another user of an incompatible device, the present invention will handle any protocol conversion and route the message via an appropriate method to the user of the incompatible device. Thus, the present invention allows users to communicate with one another even though they may have normally incompatible devices.

A preferred embodiment of a communication system, according to the present invention, provides significant advantages to users of the communication system when having to hail emergency services. Because the present invention always knows the location of the user, and likewise where emergency services are located, a preferred embodiment of the present invention allows a much quicker and more appropriate response to requests for emergency services.

A preferred embodiment of the present invention will determine the very closest emergency resources without the dependence on mobile switching centers. In fact, a preferred embodiment of the present invention will locate emergency services not identified with a mobile switching center, providing for the quickest possible response time. In addition, the present invention, according to a preferred embodiment can provide methods for contacting other WCD users in the immediate vicinity for the purposes of providing alternate forms of emergency response. The present invention can also send messages back to the user initiating the request for emergency services to indicate what type of assistance is en route, and allow the user initiating the request to contact emergency services.

In one embodiment of the present invention, a communications system includes a processor and a memory that is communicatively coupled to the processor. The communications system also includes a profile database, communicatively coupled to the processor and the memory. The profile database is adapted to store a respective profile for each respective wireless communications device within a plurality of wireless communications devices. The respective profile for each wireless communications device includes at least one respective individualized distance threshold for the respective wireless communications device. The communications system also includes a proximity service handler that is adapted to receive, from a requesting wireless communications device within the plurality of wireless communications devices, a wireless message proximity request. The communications system also is adapted to compute, in response to receiving the wireless message proximity request, distances between a location of the requesting wireless communications device and a respective location of each of a plurality of other wireless communications devices. The communications system is further adapted to compare each of the distances to the at least one individualized distance threshold within the respective profile that is stored within the profile database for the requesting wireless communications device. The communications system also is adapted to identify, in response to comparing each of the distances, a set of wireless communications devices consisting of a plurality of wireless communications devices within the plurality of other wireless communications devices that satisfy the at least one individualized distance threshold within the respective profile for the requesting wireless communications device. The communications system also includes a communications request handler adapted to send, in response to identifying the set of wireless communications devices, a wireless message proximity response to the requesting one of the plurality of wireless communications devices identifying thereto the set of wireless communications devices consisting of the plurality of wireless communications devices that satisfy the at least one individualized distance threshold.

In one embodiment of the present invention a communication system includes a number of emergency service and a central communication proximity server that is communicatively coupled to the number of emergency service. The central communications proximity server includes a profile database storing a respective profile for each of a plurality of wireless communications devices, the respective profile for each of the plurality of wireless communications devices comprising at least one individualized distance threshold for each of the plurality of wireless communications devices. The central communications proximity server also includes a proximity service handler adapted to, in response to receiving a wireless message proximity emergency service request from a requesting wireless communications device within a plurality of wireless communications devices, perform the following: compute distances between a location of the requesting wireless communications device and a respective location of each of a plurality of emergency service, compare each of the distances to the at least one individualized distance threshold within the respective profile that is stored within the profile database for the first wireless communications device, identify, in response to the comparing, a set of emergency service that satisfy the at least one individualized distance threshold within the respective profile for the requesting wireless communications device; and send an identification of the requesting wireless communications device to the set of emergency service that satisfies the at least one individualized distance threshold associated with the requesting wireless communications device.

In one embodiment of the present invention, a method includes maintaining a profile database adapted to store a respective profile for each respective wireless communications device within a plurality of wireless communications devices. The respective profile for each wireless communications device includes at least one respective individualized distance threshold for the respective wireless communications device. The method also includes sending, from a requesting wireless communications device within the plurality of wireless communications devices, a wireless message proximity request. The method further includes receiving, at a proximity service handler from the requesting wireless communications device within the plurality of wireless communications devices, the wireless message proximity request. The method also includes computing, at the proximity service handler in response to receiving the wireless message proximity request, distances between a location of the requesting wireless communications device and a respective location of each of a plurality of other wireless communications devices. The method additionally includes comparing at the proximity service handler each of the distances to the at least one individualized distance threshold within the respective profile that is stored within the profile database for the requesting wireless communications device. The method also includes identifying, at the proximity service handler in response to comparing each of the distances, a set of wireless communications devices consisting of a plurality of wireless communications devices within the plurality of other wireless communications devices that satisfy the at least one individualized distance threshold within the respective profile for the requesting wireless communications device. The method further includes sending, in response to identifying the set of wireless communications devices, a wireless message proximity response to the requesting one of the plurality of wireless communications devices identifying thereto the set of wireless communications devices consisting of the plurality of wireless communications devices that satisfy the at least one individualized distance threshold.

DESCRIPTION OF THE PREFERRED EMBODIMENTS

Figure 1:
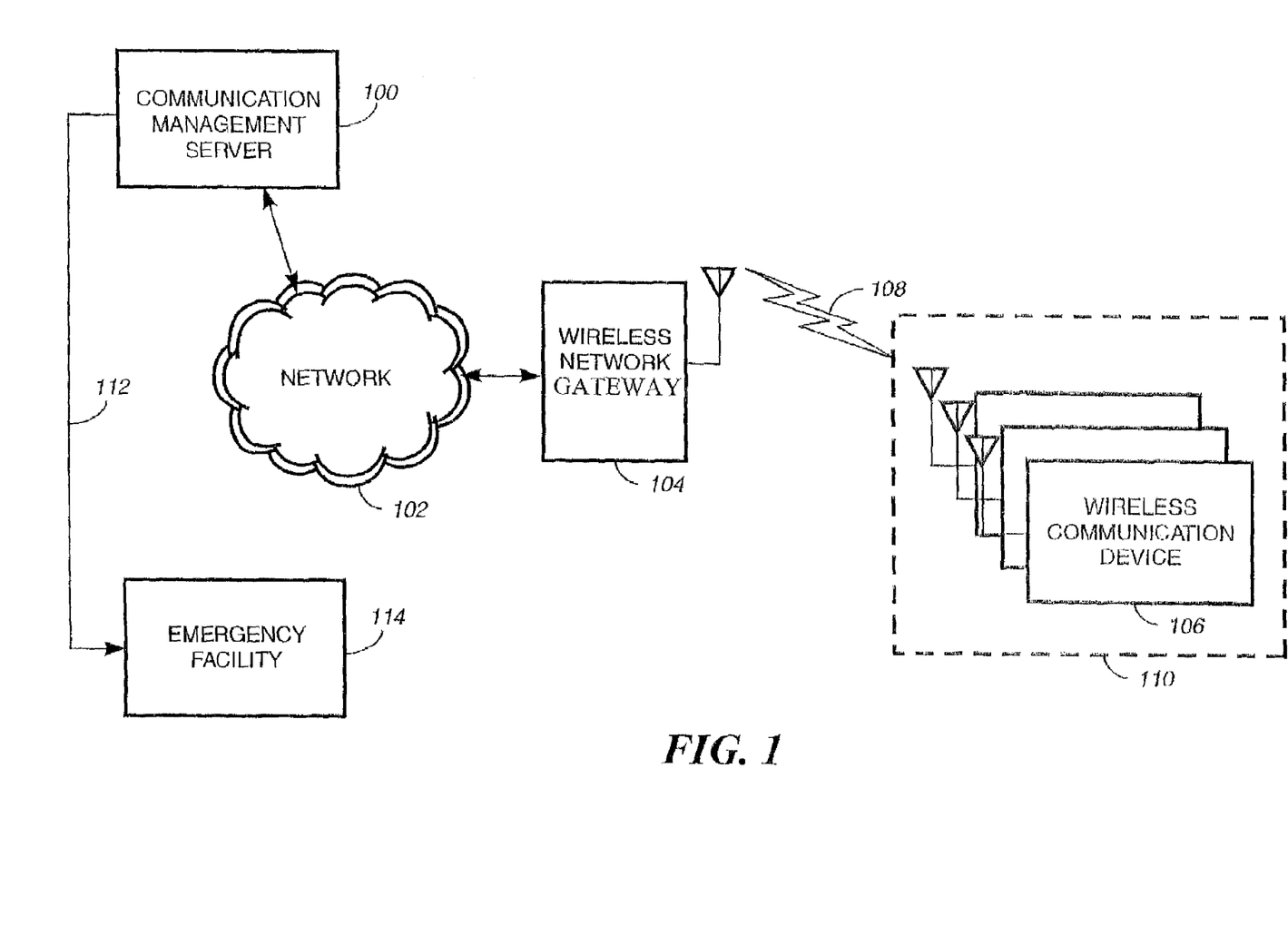
FIG. 1 is a block diagram illustrating a personal and emergency service hailing system in accordance with a preferred embodiment of the present invention.

According to a preferred embodiment of the present invention, as shown in FIG. 1, a personal and emergency services hailing system for a wireless network includes a group 110 of at least one WCD, comprised of individual WCD 106, communicating over a wireless network 108 to a wireless network gateway 104. The wireless network gateway 104 connects to another communication network 102, such as but not limited to the Internet, which is communicatively coupled to a communication management server 100. The communication management server 100 also connects to at least one emergency facility 114. This communication connection 112 between the communication management server 100 and the at least one emergency facility 114 may be any communication connection, including but not limited to a standard telephone line connection, an Internet connection, an optical connection, or a wireless connection.

Figure 2:
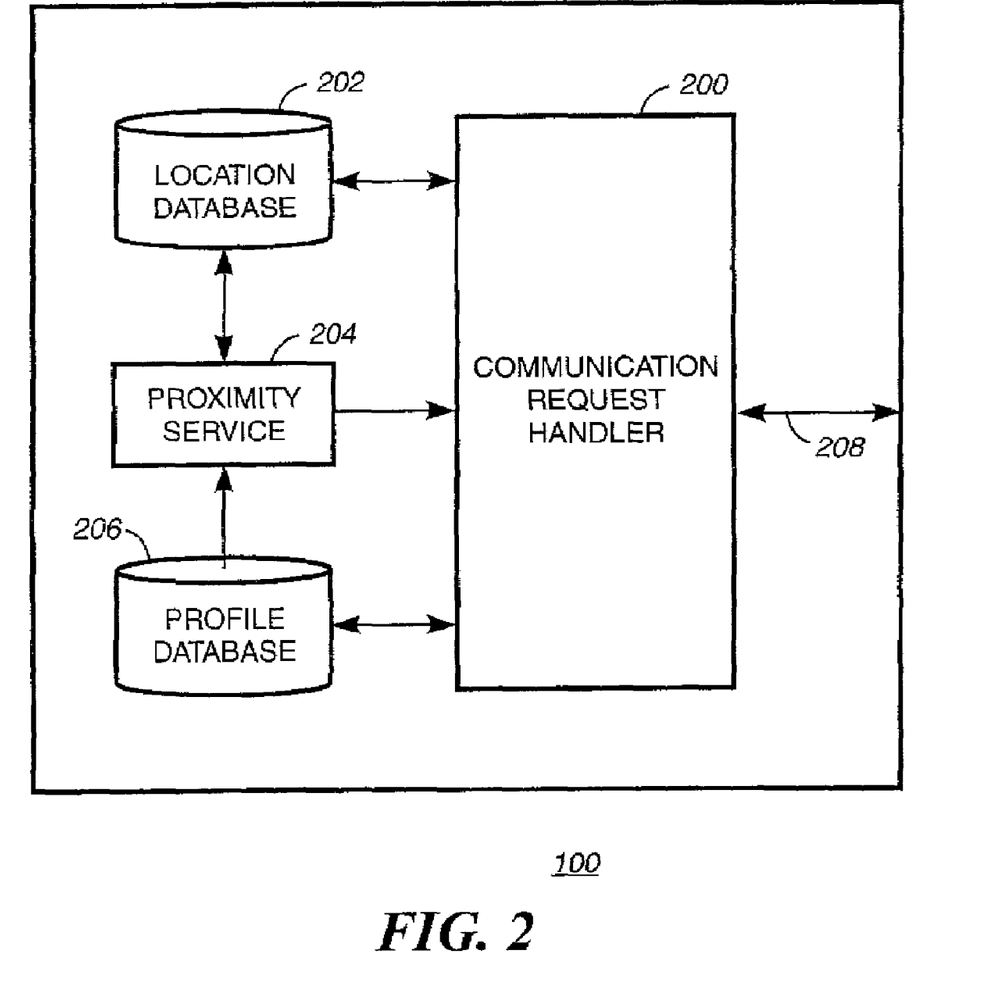
FIG. 2 is a more detailed block diagram showing a communication management server consisting of a communication request handler for providing personal hailing in the system of FIG. 1, according to a preferred embodiment of the present invention.

FIG. 2 is a block diagram of an exemplary communication management server 100 performing personal hailing services according to the preferred embodiment of the present invention depicted in FIG. 1. Communications with the network 102 of FIG. 1 are processed by the communication request handler 200 via a communication interface 208. The communication request handler 200 maintains bi-directional communication with a location database 202 and a profile database 206. The location database 202 is stored in memory for storing current location tracking information sent from individual WCDs 106 of FIG. 1, and a list of currently adjacent WCDs. The profile database 206 is stored in memory for storing a WCD preferences, such as information about the user, preferred communications devices and protocols, and the furthest distance away to look for other WCDs or emergency services, which may also be referred to as proximity preferences.

Both the location database 202 and the profile database maintain communications with a proximity service handler 204. The proximity service handler 204 will accept WCD locations from the location database 202, compute the distance between the WCD requesting hailing services and the WCDs in the location database 202, compare the distance with proximity preferences stored in the profile database 206, and communicate identification and location information of WCDs whose location meets the preferences stored in the profile database 206 to the communication request handler 200. The proximity service handler 204 also calculates lists of currently adjacent WCDs and stores these lists in the location database 202 for efficient determination of those WCDs in proximity to a requesting WCD.

Figure 3:
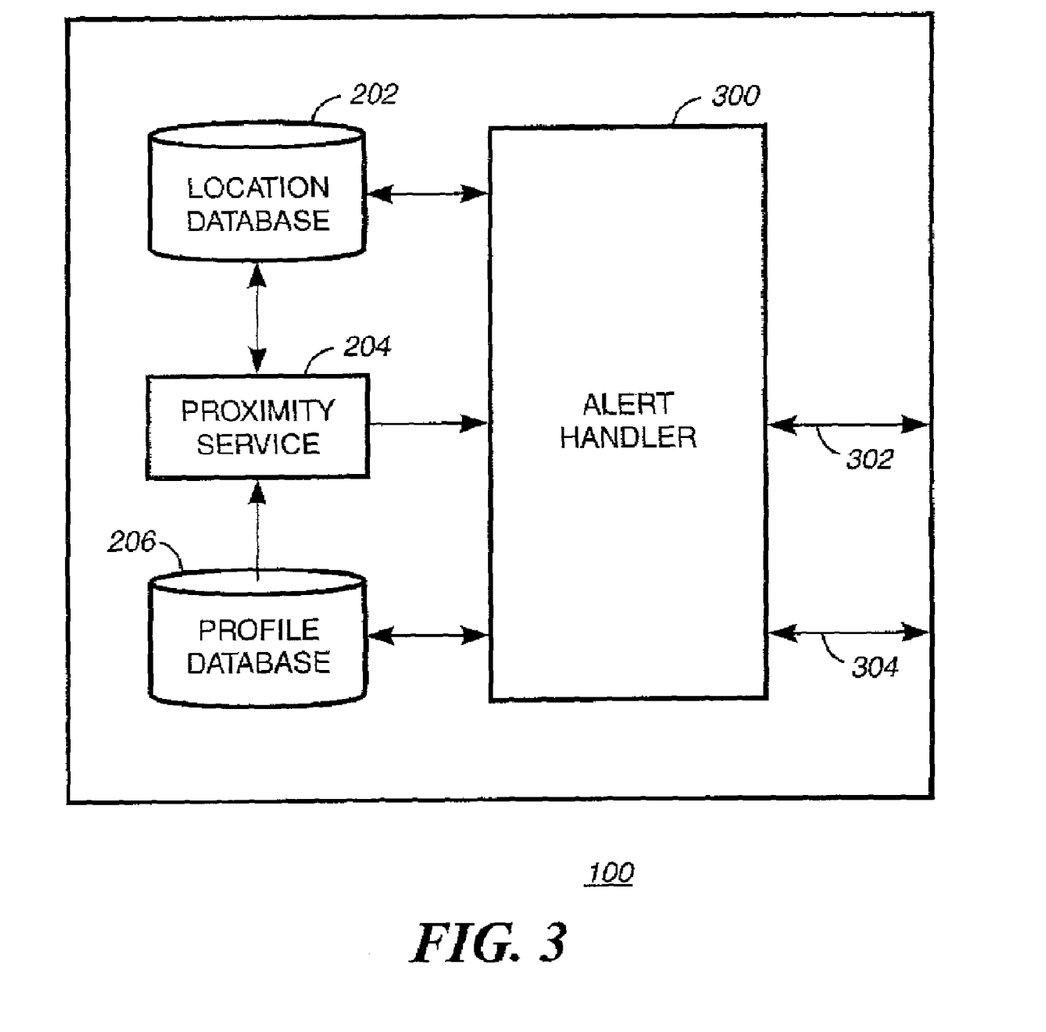
FIG. 3 is a more detailed block diagram showing a communication management server consisting of an alert handler for providing emergency service hailing in the system of FIG. 1, according to a preferred embodiment of the present invention.

FIG. 3 provides a block diagram of the communication management server 100 performing emergency services hailing in a preferred embodiment of the present invention as depicted in FIG. 1. To perform emergency services hailing, the location database 202, the proximity service handler 204, and the profile database 206 of FIG. 2 maintain communications with an alert handler 300. The alert handler maintains a bi-directional communication interface 302 with the network 102 shown in FIG. 1, and a unidirectional or bi-directional communication interface 304 with the emergency facility 114 of FIG. 1 via a communication connection 112 as depicted in FIG. 1.

Note that emergency services, as used herein, may include many different forms of emergency resources that could respond to an emergency condition. For example, emergency services comprises at least one from the following list: an emergency facility, an emergency mobile unit, an emergency service person, an officer with wireless communications device, and an individual with wireless communications device. Other types of emergency services that are reachable according to the present invention should be obvious to those of ordinary skill in the art in view of the present discussion.

Figure 4:
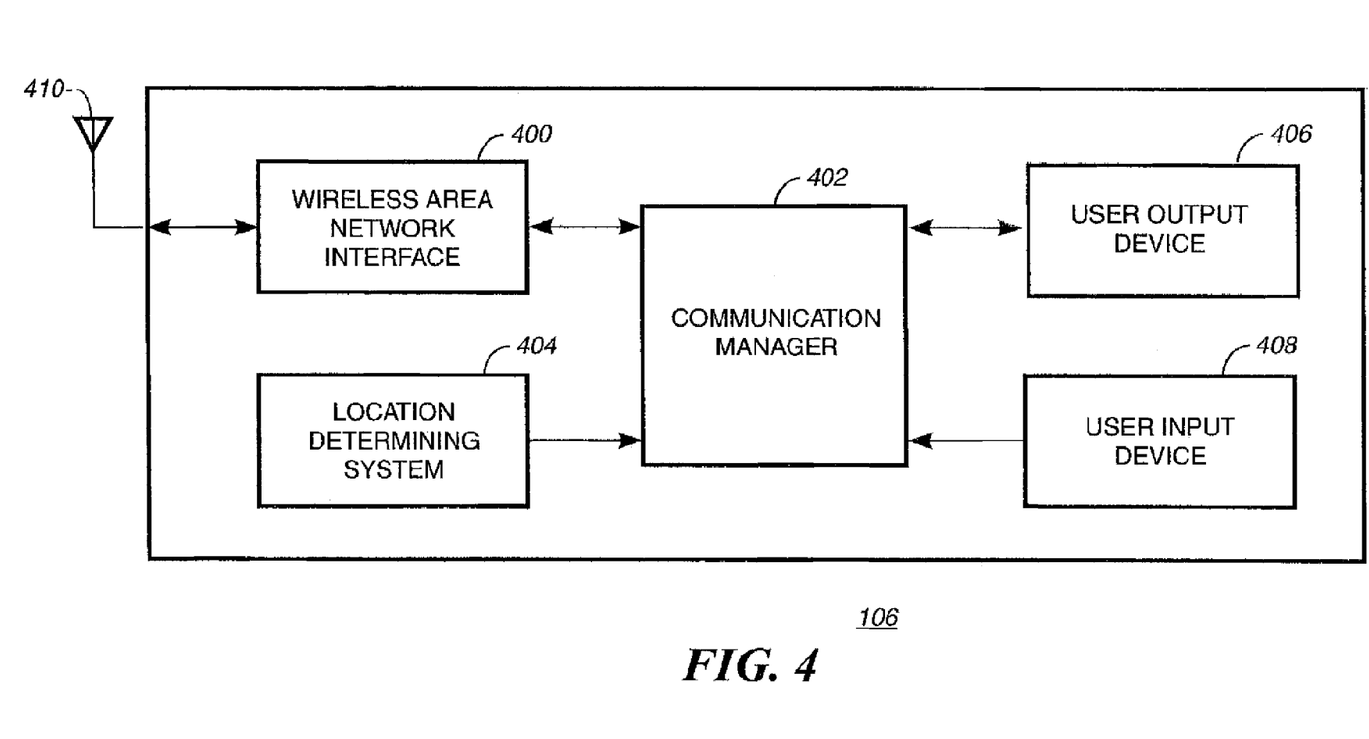
FIG. 4 is a more detailed block diagram showing a WCD in the system of FIG. 1, according to a preferred embodiment of the present invention.

Depicted in FIG. 4 is a block diagram of a WCD 106 of FIG. 1 according to a preferred embodiment of the present invention. The WCD 106 has a wireless area network interface 400 and a transmission device 410 for communicating with the wireless area network or FIG. 1. In a preferred embodiment of the present invention, the transmission device 410 may comprise an antenna, an optical transmitter/receiver, or any other communications device suitable for use with a wireless area network. The wireless area network interface 400 processes the communications between the wireless area network 108 of FIG. 1 and the communication manager 402. The communication manager 402 receives location information from a location determining system 404. The location determining system 404 may utilize a GPS receiver or any other means of determining absolute position, as should become obvious to those of ordinary skill in the art in view of the present discussion. The communication manager 402 also maintains communications with the user output device 406, which may comprise a display of any type, an audible signal generator, or both. The communication manager 402 also accepts inputs from a user input device 408, which can be any method of input including but not limited to push buttons, keypads, joysticks, microphones, and other sensors. In some implementations, the WCD may combine the user output device 406 and the user input device 408, such as touch screen devices.

Figure 5:
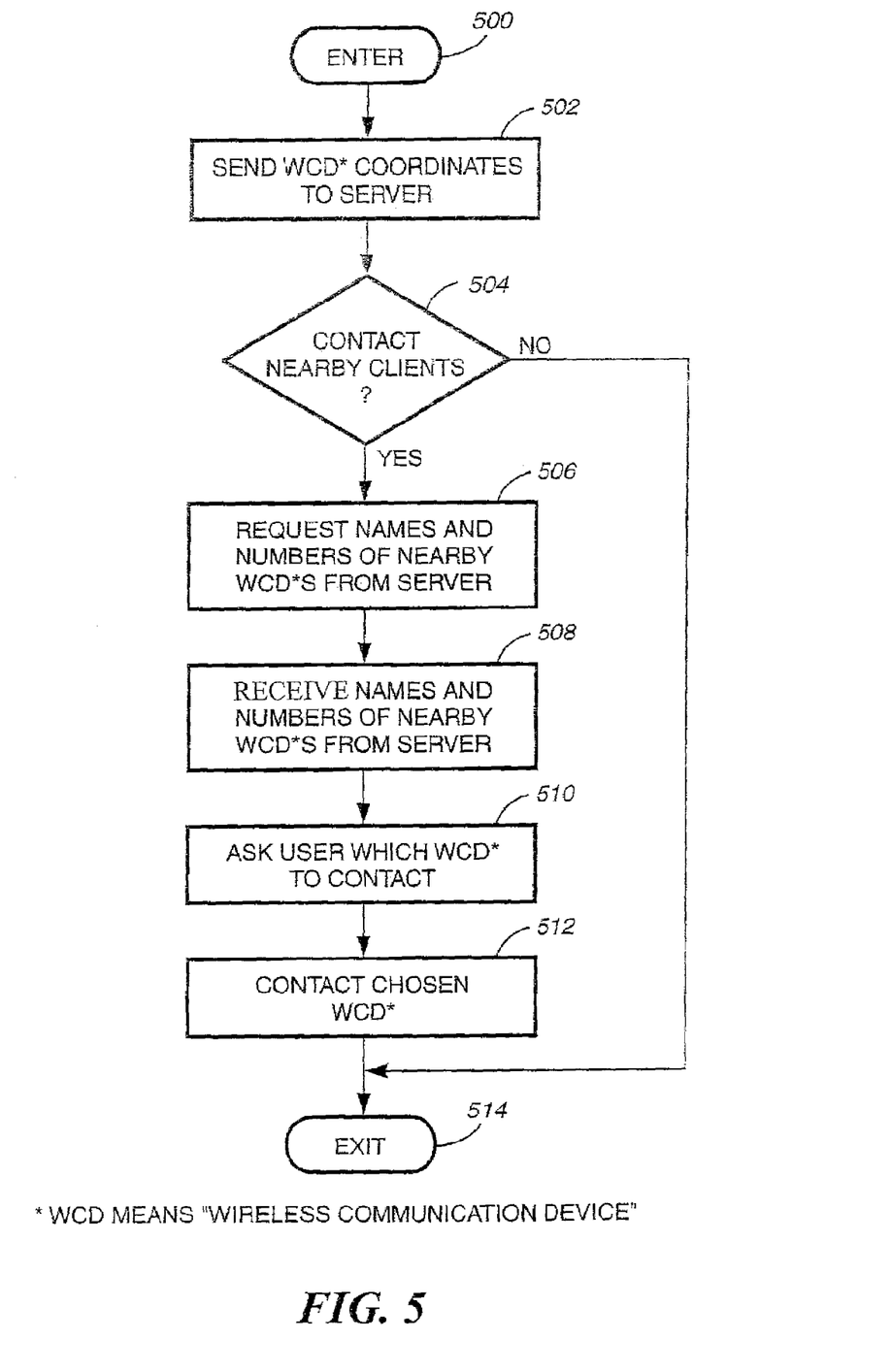
FIGS. 5, 6, and 7 are three operational flow diagrams illustrating three exemplary operational sequences for the system of FIG. 1, according to preferred embodiments of the present invention.

FIG. 5 depicts an exemplary operational flow diagram describing a personal hailing operational sequence of the WCD according to a preferred embodiment of the present invention. The WCD may be running other processes contemporaneously with its operations according to the present invention. Upon entering the operational sequence, at step 500, the WCD will send, at step 502, its location information, sometimes referred to as coordinates, to the communication management server 100. Next, the WCD determines, at step 504, whether the user has indicated that they would like to contact another user of a WCD. If the user has not so indicated, the operational sequence is terminated, at step 514. The sequence may be immediately resumed, or may wait for a certain event before resuming.

If the user has indicated that they wish to contact another user of a WCD, the WCD requests, at step 504, the names and identifiers of nearby WCD from the communication management server 100. The WCD typically sends at least one wireless message proximity request to the communication management server 100 to initiate such a request. The WCD then receives at least one response message from the communication management server 100. Preferably, the at least one response message comprises a wireless message proximity response that identifies the requested information. After receiving, at step 508, a response message comprising the names and identifiers of nearby WCDs (that satisfy a proximity requirement associated with the requesting WCD) from the communication management server 100, the WCD prompts, at step 510, the user to select a nearby WCD to contact. For example, this prompting can be done by displaying choices on a display (not shown) or by another user output device 406. Once a WCD is selected by the user, at step 512, communication with the chosen WCD is initiated and the sequence terminates, at step 514. The sequence may be immediately resumed, or may wait for a certain event before resuming.

Figure 6:
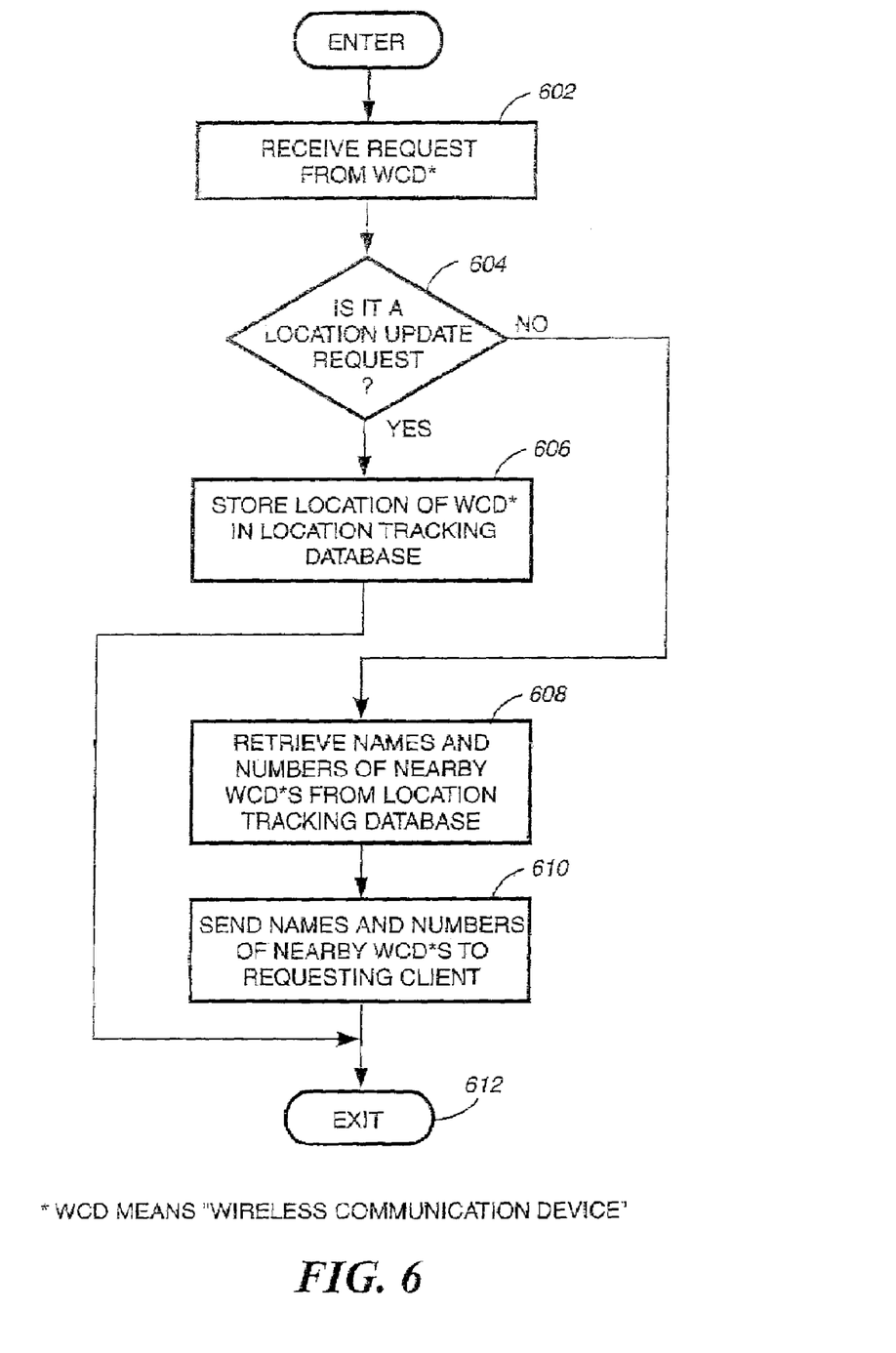

FIG. 6 illustrates an exemplary operational sequence for the communication management server 100 in accordance with a preferred embodiment of the present invention. Once the communication management server 100 receives, at step 602, a communication from a WCD, the server determines, at step 604, whether it is a location update request. If the communication is a location update request, then the communication management server 100 stores, at step 606, the location of the WCD in the location-tracking database, and then exits the operational sequence, at step 612.

However, if the communication is not a location update request but is a request for personal hailing services, the communication management server retrieves, at step 608, the information of nearby WCDs (that satisfy a proximity requirement associated with the requesting WCD), such as names, numbers, identifiers, aliases, preferred devices, or any combination thereof. This information is then sent, at step 610, in at least one response message to the WCD requesting personal hailing services, and then the communication management server 100 exits the operational sequence, at step 612. Preferably, the at least one response message comprises a wireless message proximity response that identifies the requested information.

Figure 7:
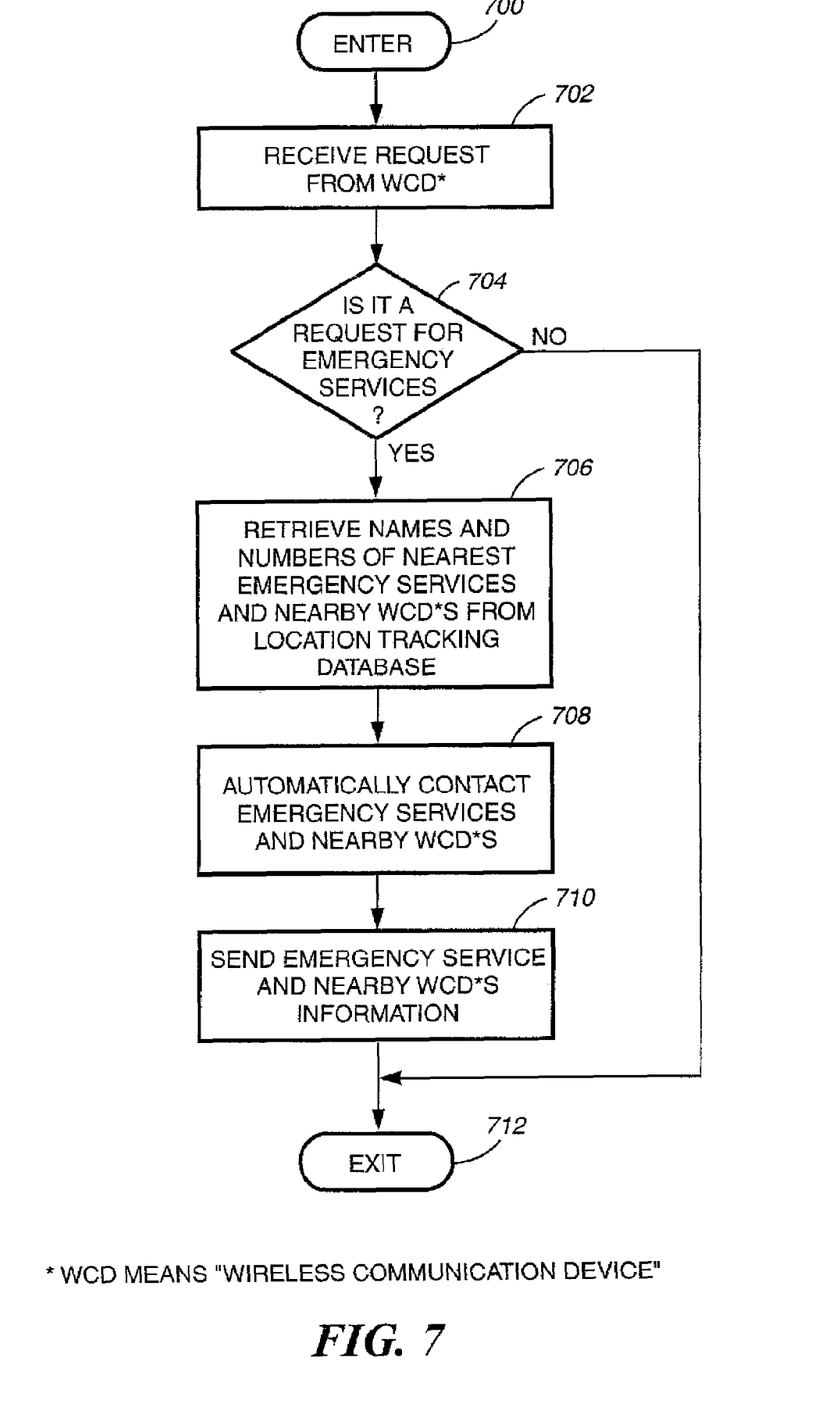

FIG. 7 is an exemplary operational flow diagram of an emergency services hailing operational sequence of the communication management server 100 according to a preferred embodiment of the present invention. The operational sequence is initiated, at step 700. Upon receiving, at step 702, a communication request from a WCD, the communication management server 100 determines, at step 704, whether the communication is a request for emergency services. If the communication request is not a request for emergency services, the alert hailing operational sequence is terminated, at step 712. The operational sequence can be re-entered, at step 700, immediately or at any time.

If the communication request is determined, at step 704, to be a request for emergency services, the communication request handler retrieves, at step 708, the information, which may include names, numbers, identifiers, aliases, preferred devices, or any combination thereof, of the nearest emergency services and nearby WCDs (that satisfy a proximity requirement associated with the requesting WCD). The communication management server 100 will then automatically contact (e.g., by sending a signal and/or a message thereto), at step 708, the emergency services and nearby WCDs that satisfy the proximity requirement associated with the requesting WCD. The communication management server 100 will also preferably send, at step 710, emergency service and nearby WCD information to the WCD requesting the emergency services. This information can be provided to the user of the requesting WCD, such as via a display (not shown). At this point the emergency service hailing operational sequence terminates, at step 712. However, the WCD requesting the emergency service hailing may choose to contact the emergency services or the nearby WCD, such as by utilizing the information received by the requesting WCD, and preferably provided to the user, to initiate communication, at step 710, and/or by using the personal hailing operational sequence as depicted in FIG. 6. The emergency service hailing operational sequence may be re-entered, at step 700, immediately or at any time.

The present invention can be realized in hardware, software, or a combination of hardware and software. A communication management server 100 such as shown in FIGS. 1, 2, and 3, according to the preferred embodiments of the present invention, can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Similarly, the operation sequence of the WCD depicted in FIGS. 1 and 4 can be realized in hardware, software, or any combination thereof. Any kind of computer system—or other apparatus adapted for carrying out the methods described herein—is suited. A typical combination of hardware and software, for example, could be a cellular phone with a computer program that, when being loaded and executed, controls the cellular phone such that it carries out the methods described herein.

The present invention can also be embedded in a computer program product, which comprises all the features enabling the implementation of the methods described herein, and which—when loaded in a computer system or a wireless device—is able to carry out these methods. Computer program means or computer program in the present context can be any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A communication system, comprising:
 a processor;
 a memory, communicatively coupled to the processor;
 a profile database, communicatively coupled to the processor and the memory, the profile database adapted to store a respective profile for each respective wireless communications device within a plurality of wireless communications devices, the respective profile for each wireless communications device comprising at least one respective individualized distance threshold for the respective wireless communications device;
 a proximity service handler adapted to:
  receive, from a requesting wireless communications device within the plurality of wireless communications devices, a wireless message proximity request;
  compute, in response to receiving the wireless message proximity request, distances between a location of the requesting wireless communications device and a respective location of each of a plurality of other wireless communications devices;
  compare each of the distances to the at least one individualized distance threshold within the respective profile that is stored within the profile database for the requesting wireless communications device;

identify, in response to comparing each of the distances, a set of wireless communications devices consisting of a plurality of wireless communications devices within the plurality of other wireless communications devices that satisfy the at least one individualized distance threshold within the respective profile for the requesting wireless communications device; and a communications request handler adapted to send, in response to identifying the set of wireless communications devices, a wireless message proximity response to the requesting wireless communications device identifying thereto the set of wireless communications devices consisting of the plurality of wireless communications devices that satisfy the at least one individualized distance threshold.

2. The communication system of claim 1, wherein the proximity service handler computes the distances with processing comprising retrieving a respective location of each of at least one other wireless communications device that had been stored in a location database prior to receiving the request.

3. The communication system of claim 1, wherein the proximity service handler is adapted to compute, compare, and identify prior to receiving a communication request from the requesting wireless communications device, the proximity service handler further adapted to:

store, in a location database, a description of the set of wireless communications devices consisting of a plurality of wireless communications devices within the plurality of other wireless communications devices that satisfy the at least one individualized distance threshold within the respective profile for the requesting wireless communications device; and retrieve, from the location database in response to receiving the communication request from the requesting communications device, the description of the set of wireless communications devices consisting of a plurality of wireless communications devices within the plurality of other wireless communications devices that satisfy the at least one individualized distance threshold within the respective profile for the requesting wireless communications device, wherein the proximity service handler sends the wireless message proximity response after retrieving the set of wireless communications devices.

4. The communication system of claim 1, further comprising:

the plurality of wireless communications devices comprising the requesting wireless communications device.

5. The communication system of claim 4, wherein the requesting wireless communications device, in response to receiving the a wireless message proximity response sent in response to the wireless message proximity request, displays choices to a user via a display to prompt the user to make a selection of at least one of the plurality of wireless communications devices that satisfy the at least one individualized distance threshold.

6. The communication system of claim 4, wherein each of the plurality of wireless communications devices comprises a location determining system for determining location information corresponding to the at least one wireless communications device in the communication system, and wherein the wireless message proximity request comprises the location information.

7. The communication system of claim 4, wherein the requesting wireless communications device is adapted to:

receive, in response to the wireless message proximity request, a selection of a selected wireless communications device from within the set; and initiate, in response to receiving the selection, communications between the requesting wireless communications device and the selected wireless communications device.

8. The communication system of claim 4, wherein the requesting wireless communications device is adapted to:

receive, in response to the wireless message proximity request, a selection of a selected wireless communications device from within the set, wherein the selected wireless communications device is incompatible with the requesting wireless communications device;

initiate, in response to receiving the selection and based on the selected wireless communications device being incompatible with the requesting wireless communications device, communications between the requesting wireless communications device and the selected wireless communications device; and perform a protocol conversion between the requesting wireless communications device and the selected communications device.

9. A communication system comprising:

a plurality of emergency service; and a central communication proximity server, communicatively coupled to the plurality of emergency service, the central communications proximity server comprising:

a processor;

a memory, communicatively coupled to the processor;

a profile database, communicatively coupled to the processor and the memory, storing a respective profile for each of a plurality of wireless communications devices, the respective profile for each of the plurality of wireless communications devices comprising at least one individualized distance threshold for each of the plurality of wireless communications devices; and a proximity service handler, communicatively coupled to the processor, the memory and the profile database, adapted to, in response to receiving a wireless message proximity emergency service request from a requesting wireless communications device within a plurality of wireless communications devices, perform the following:

compute distances between a location of the requesting wireless communications device and a respective location of each of a plurality of emergency service;

compare each of the distances to the at least one individualized distance threshold within the respective profile that is stored within the-profile database for the first wireless communications device;

identify, in response to the comparing, a set of emergency service that satisfy the at least one individualized distance threshold within the respective profile for the requesting wireless communications device; and send an identification of the requesting wireless communications device to the set of emergency service that satisfies the at least one individualized distance threshold associated with the requesting wireless communications device.

10. The communication system of claim 9, wherein the plurality of emergency service comprises at least one from the following list of emergency services: an emergency facility, an emergency mobile unit, an emergency service person, an officer with wireless communications device, and an individual with wireless communications device.

11. The communication system of claim 9, wherein the proximity service handler, in response to the wireless message proximity emergency service request, is adapted to additionally send a wireless message proximity response to the requesting wireless communications device for identifying thereto at least the selected at least one of the plurality of emergency services.

12. The communication system of claim 11, wherein the requesting wireless communications device includes a display, and wherein the requesting wireless communications device displays to a user choices from information received in the wireless message proximity response for prompting the user to select at least one of the plurality of emergency service that satisfies the at least one individualized distance threshold to initiate communication therewith.

13. The communication system of claim 11, wherein the requesting wireless communications device includes a display, and in response to receiving the wireless message proximity response, displays information via the display for identifying the selected at least one of the plurality of emergency service that satisfies the at least one individualized distance threshold.

14. A method, comprising:
maintaining a profile database adapted to store a respective profile for each respective wireless communications device within a plurality of wireless communications devices, the respective profile for each wireless communications device comprising at least one respective individualized distance threshold for the respective wireless communications device;
sending, from a requesting wireless communications device within the plurality of wireless communications devices, a wireless message proximity request;
receiving, at a proximity service handler from the requesting wireless communications device, the wireless message proximity request;
computing, at the proximity service handler in response to receiving the wireless message proximity request, distances between a location of the requesting wireless communications device and a respective location of each of a plurality of other wireless communications devices;
comparing at the proximity service handler each of the distances to the at least one individualized distance threshold within the respective profile that is stored within the profile database for the requesting wireless communications device;
identifying, at the proximity service handler in response to comparing each of the distances, a set of wireless communications devices consisting of a plurality of wireless communications devices within the plurality of other wireless communications devices that satisfy the at least one individualized distance threshold within the respective profile for the requesting wireless communications device; and
sending, in response to identifying the set of wireless communications devices, a wireless message proximity response to the requesting wireless communications device identifying thereto the set of wireless communications devices consisting of the plurality of wireless communications devices that satisfy the at least one individualized distance threshold.

15. The method of claim 14, wherein the computing the distances comprises retrieving a respective location of each of at least one other wireless communications device stored in a location database prior to receiving the request.

16. The method of claim 14, wherein the computing, comparing, and identifying are performed prior to receiving a communication request from the requesting wireless communications device, the method further comprising:
storing, in a location database, a description of the set of wireless communications devices consisting of the plurality of wireless communications devices within the plurality of other wireless communications devices that satisfy the at least one individualized distance threshold within the respective profile for the requesting wireless communications device; and
retrieving, from the location database in response to receiving the communication request from the requesting wireless communications device, the description of the set of wireless communications devices consisting of a plurality of wireless communications devices within the plurality of other wireless communications devices that satisfy the at least one individualized distance threshold within the respective profile for the requesting wireless communications device,
wherein the sending the wireless message proximity response is performed after retrieving the set of wireless communications devices.

17. The method of claim 14, further comprising displaying, at the requesting wireless communications device in response to receiving the wireless message proximity response sent in response to the wireless message proximity request, choices to a user via a display to prompt the user to make a selection of at least one of the plurality of wireless communications devices that satisfy the at least one individualized distance threshold.

18. The communication system of claim 14, wherein each of the plurality of wireless communications devices comprises a location determining system for determining location information corresponding to the at least one wireless communications device in the communication system, and wherein the wireless message proximity request comprises the location information.

19. The method of claim 14, further comprising:
receiving, at the requesting wireless communications device in response to receiving the wireless message proximity request, a selection of a selected wireless communications device from within the set; and
initiating, in response to receiving the selection, communications between the requesting wireless communications device and the selected wireless communications device.

20. The method of claim 14, further comprising:
receiving, at the requesting wireless communications device in response to receiving the wireless message proximity request, a selection of a selected wireless communications device from within the set, wherein the selected wireless communications device is incompatible with the requesting wireless communications device;
initiating, in response to receiving the selection and based on the selected wireless communications device being incompatible with the requesting wireless communications device, communications between the requesting wireless communications device and the selected wireless communications device; and
performing a protocol conversion between the requesting wireless communications device and the selected communications device.

* * * * *